G. E. STANLEY.
DRIVING MECHANISM OF MOTOR CYCLES AND THE LIKE.
APPLICATION FILED NOV. 28, 1916.

1,251,933. Patented Jan. 1, 1918.

Inventor:
George Enoch Stanley

UNITED STATES PATENT OFFICE.

GEORGE ENOCH STANLEY, OF COVENTRY, ENGLAND.

DRIVING MECHANISM OF MOTOR-CYCLES AND THE LIKE.

1,251,933.        Specification of Letters Patent.        Patented Jan. 1, 1918.

Application filed November 28, 1916. Serial No. 133,876.

*To all whom it may concern:*

Be it known that I, GEORGE ENOCH STANLEY, a subject of the King of Great Britain, and resident of Coventry, in the county of Warwick, England, have invented certain new and useful Improvements in the Driving Mechanism of Motor-Cycles and the like, of which the following is a specification.

This invention relates to the driving mechanism of motor cycles and the like, and it has for its object to provide improved means for cushioning the drive between a chain sprocket or the like and a hub shell. The mechanism employed is of the kind in which a nut is free to travel on a screw thread on the one member and have a sliding connection, by means of splines or the like, with the other member, while its sliding movement is resisted by springs.

According to this invention, there is arranged within the hub shell a driving sleeve which is mounted upon bearings upon a fixed spindle and carries the chain sprocket or the equivalent. This sleeve and the interior of the hub shell are connected together by the nut. That is to say, upon the one is formed the screw thread, and upon the other the splines.

In the accompanying drawings.

Like letters indicate like parts in both views.

Figure 1:
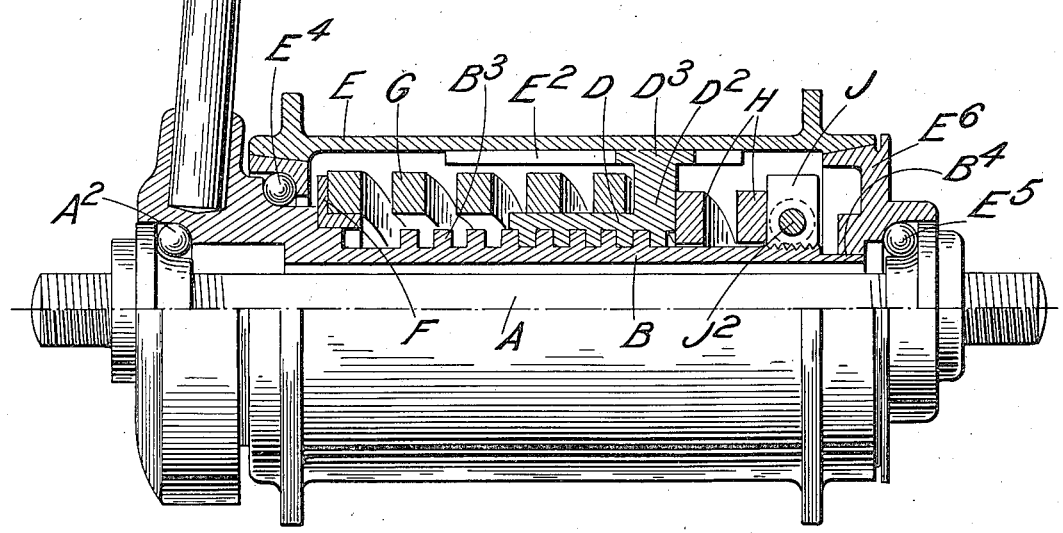
Figure 1 is a sectional elevation showing the interior of a hub shell to which this invention has been applied.
Figure 2:
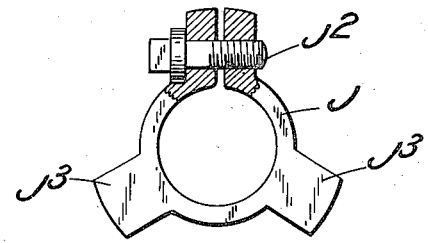
Fig. 2 is a detail view of a part.

In the construction illustrated there is mounted on a bearing $A^2$ on the wheel spindle A a driving sleeve B which carries a driving member. The drawing shows one of the spokes $B^2$ of a belt pulley. The driving sleeve B is provided with a coarse screw thread $B^3$ of any suitable pitch, and upon this travels a nut D. The nut is formed with a flange $D^2$ the edge $D^3$ of which is toothed or splined.

The teeth at $D^3$ engage keyways or splines $E^2$ on the hub shell E. This is carried upon a bearing $E^4$ on the driving sleeve at one end and upon a bearing $E^5$ on the spindle at the other end. The driving sleeve B at $B^4$ takes a bearing inside the disk $E^6$ attached to or forming part of the hub shell. Thus the hub shell is mounted upon bearings upon the driving sleeve B. Between the nut D, $D^2$ and a suitable abutment at F on the driving sleeve is a spring G and there may be a cushion spring H between the back of the nut D and a collar J screwing on the driving sleeve. Any suitable means may be employed to lock the collar J, that shown consisting of a screw $J^2$ which is used to draw together the radially split portions of the collar. The collar is provided with arms $J^3$ against which the spring H bears.

It will be noticed that the complete mechanism can be fitted upon the spindle A and removed in an assembled condition.

In operation, when the driving sleeve B is rotated from the engine the first tendency will be for the nut $D^2$ not to rotate, owing to its connection at $D^3 E^2$ with the hub shell. The nut therefore screws along the driving sleeve against the spring and the spring pressure gradually increases so that resistance against axial movement becomes greater than the resistance against rotation and the nut will revolve, taking with it the hub shell. Fluctuation of load alters the relationship between the load resistance and the spring resistance so that the nut varies its position on the driving sleeve and shocks are cushioned.

An important feature is that all the working parts are inclosed, and that the hub shell is of small dimensions.

What I claim as my invention, and desire to secure by Letters Patent, is:—

1. In the driving mechanism of a motor cycle, the combination of a driving sleeve, a hub shell driven therefrom, bearings therefor, a nut between said sleeve and said hub shell, the said nut having a thread connection with said sleeve, and a splined connection with said hub shell, a spring acting on said nut, and an abutment for said spring, substantially as set forth.

2. In the driving mechanism of a motor cycle, the combination of a driving sleeve, a hub shell driven therefrom, bearings therefor, a nut between said sleeve and said hub shell, the said nut having a thread connection with said sleeve, and a splined connection with said hub shell, an abutment on said driving sleeve, a spring between said abutment and said nut, and a cushion behind said nut, substantially as set forth.

3. In the driving mechanism of a motor cycle, the combination of a driving sleeve, a hub shell driven therefrom, bearings therefor, a nut between said sleeve and said hub shell, the said nut having a thread connection with said sleeve, and a splined connection with said hub shell, an abutment on said driving sleeve, a spring between said abutment and said nut, a cushion spring behind said nut and an abutment for said cushion spring which is adjustable on said driving sleeve, substantially as set forth.

In testimony whereof I have signed my name to this specification in the presence of two subscribing witnesses.

GEORGE ENOCH STANLEY.

Witnesses:
 ERIC W. WALFORD,
 J. FAZAKARLEY.